Patented June 8, 1926.

1,588,253

UNITED STATES PATENT OFFICE.

FRANK C. MATHERS AND HERMAN T. BRISCOE, OF BLOOMINGTON, INDIANA; SAID BRISCOE ASSIGNOR TO SAID MATHERS.

METHOD OF TREATING LIMESTONE.

No Drawing.      Application filed July 14, 1925. Serial No. 43,615.

Our invention relates to a new and improved method of treating limestone.

An object of our invention is to produce from ordinary dolomitic limestone a dry hydrated lime which when subsequently made into a putty with water becomes plastic.

A further object is to produce from such limestone a quicklime which shall react slowly with water.

A further object is, to produce from such limestone a quicklime which is soft and easily crushed.

The finishing coat in wall plastering comprises, essentially, quicklime treated with water and in order to apply such a coating satisfactorily it is necessary that the quicklime shall be thoroughly hydrated and when being applied shall be moist and plastic. Quicklime is the oxide of calcium containing more or less magnesium oxide, and hydrated lime is usually produced by hydrating such quicklime. The usual method of preparing material for the finishing coat from ordinary quicklime is to add sufficient water to the quicklime so that the excess water beyond that required for changing the quicklime to slaked lime produces a wet mass known as "lime putty." Such "lime putty" is plastic and can be spread easily upon the wall. Very often this lime putty is mixed or "gauged" with plaster of Paris and other things. By plastic is meant that property in the wet hydrated lime which causes it to flow or spread readily under the trowel without drying out through the uction of the underneath coat and becoming "sticky" or "draggy." A plasterer can do more and better work with such plastic material than he can with a non-plastic one. Almost any quicklime will give a plastic putty when slaked to a wet mass as outlined above. This method is still used very widely but there are many objections to it since the plasterer is unable to get a uniform slaking due to variations in the quicklime itself—its age, the temperature conditions, etc. In using the lime putty thus prepared the unslaked masses must be screened out of the product, but even with such screening small pieces of slow slaking quicklime will pass sometimes and not become slaked until after the material has been applied to the wall, and these small masses will then produce what is known as "popping." Moreover the labor cost of thus preparing the lime putty is high.

On account of these facts dry hydrated lime instead of the freshly slaked quicklime has been of recent years used for various purposes more and more extensively by plasterers. The dry hydrated lime is made by the original lime producer by grinding the quicklime after it leaves the kiln and placing it in a suitable hydrator provided with paddles or other stirring devices, just enough water being added to change the quicklime into the dry hydrated lime which is a very fine powder. This dry hydrated lime comes to the plasterer in bags convenient to handle and if of uniform quality and adapted for his intended use the plasterer has only to soak this hydrated lime with the right amount of water overnight and use it. As experience has demonstrated ordinary dry hydrated lime does not have this characteristic of becoming plastic when soaked. It has been found in practice that only the hydrates made from the peculiar dolomitic limestone such as is quarried near Woodville, Ohio, when calcined and hydrated in the ordinary manner will produce dry hydrates which will be plastic after soaking. This Woodville, Ohio. limestone for some reason, not known, will produce a dry hydrate which when subsequently soaked with water becomes plastic and for that reason it is a very extraordinary limestone and hydrate made therefrom is greatly in demand for finishing coats. Dry hydrates produced from ordinary limestone are non-plastic when subsequently soaked and are called "masons' hydrate" as distinguished from the so-called "finishing hydrate" such as that which comes from Woodville. The Woodville district thus has practically a monopoly upon hydrates for finishing coats. The ordinary limestones vary in composition from substantially pure calcium carbonate to a mixture of about fifty-five per cent calcium carbonate and forty-five per cent magnesium carbonate, the limestone containing the mixed carbonates being called "dolomitic." The majority of limestones in the eastern part of the United States are dolomitic or at least fairly high in magnesium carbonate. The term "dolomite" or "dolomitic limestone" is here employed somewhat loosely for limestones containing notable quantities of magnesium carbonate and is not restricted to the true double compound calcium magnesium carbonate, $CaMg(CO_3)_2$. By our invention the ordinary dolomitic limestones can be used to produce quicklime and dry hydrates having the following valuable properties, viz:

(1) Dry hydrated lime prepared according to our process from ordinary dolomitic limestone when subsequently made into a putty with water becomes plastic.

(2) The quicklime prepared according to our process from ordinary dolomitic limestone is soft and may be rubbed or ground to a fine powder much more easily than ordinary quicklime.

(3) The quicklime produced by our process is less active toward water and slakes to a finer hydrate than the ordinary quicklime which may slake or re-act with water with an almost explosive effect. This very great and undesirable activity of quicklime towards water is found especially in those dolomitic quicklimes which are burned at low temperatures or for short periods of time at somewhat higher temperatures. The latter conditions of burning are found especially with rotary kilns. These very active quicklimes produce dry hydrates that are coarse or "sandy." Such hydrates are highly undersirable in that they are very non-plastic and lack in "sand carrying capacity."

In carrying out our process we take ordinary dolomitic limestone and add to it sodium chloride or a similar alkali metal salt of a mineral acid, such as potassium chloride or sodium sulphate. This salt may be added to the limestone in the kiln as a dry salt prior to or during the burning or calcining of the limestone, or the limestone may be treated with a solution of the salt before it is put into the kiln. If it is moistened with a solution of the salt, we preferably use a 10% solution of the salt. Whether the salt is added in dry form or as a solution, we preferably add to the limestone when a rotary kiln is used about sixty hundredths per cent (.60%) by weight of the limestone to be treated. We prefer to add sixty hundredths per cent (.60%) of the salt because if a larger amount is added no better results are apparently attained and the salt may be wasted by volatilization unless the vapors are led away and condensed. If a smaller amount of the salt is used the plasticity of the hydrate when subsequently soaked is less than when sixty hundredths per cent (.60%) is added. As will be evident however, the amount of salt can be varied above and below to a very considerable extent in carrying out our invention according to varying conditions of operations of the kilns and differences in the degree of plasticity and activity toward water and softness to be attained.

In burning a mixture of the limestone and the salt good results are obtained if they are burned at temperatures of 1000° to 1200° centigrade, for a period varying from two hours at 1200° centigrade to fifteen hours at 1000° centigrade, these being substantially greater than the range of temperature and time commonly used in making quicklimes from ordinary dolomites. We prefer 1100° centigrade for two hours of actual burning. It must be remembered that the temperature and time of burning in ordinary practice vary greatly in different plants. Also the temperature and the actual time of burning cannot be easily determined. It must be remembered that the higher the temperature the shorter should be the time of burning.

The quicklime thus produced by our process is so soft that it can be easily reduced to a powder, which is not the case with quicklimes produced from ordinary unsalted dolomitic limestone by the same burning treatment. In one specific case the crushing strength of the quicklime from the stone that had been treated with salt was 2158 as compared to 6880 for the quicklime from ordinary or untreated stone. However the higher the temperature of burning the harder the quicklime. This agrees with the commercial experience in burning ordinary limestone. We prefer low temperatures if a soft quicklime is desired.

After calcining the limestone treated with the salt we grind the quicklime as is the practice in ordinary plants desiring to make hydrated lime.

The activity of such powdered quicklime is such that upon the addition of the water it does not become hot from the reaction for a minute or two after it is mixed with the water. Quicklime made from ordinary dolomitic limestone in the ordinary manner by burning at a low temperature or at a high temperature for a short period of time, hereinafter called "untreated quicklime" when mixed with water reacts instantly and sometimes with almost an explosive effect. Increased temperature and time of burning ordinary limestone decreases this activity towards water just as it will do with treated limestone. Too great activity of the quicklime towards water is not a problem in many lime plants unless rotary kilns are used.

After grinding the quicklime we hydrate it in the ordinary way familiar to those skilled in the art of making finishing hydrates. We prefer to use 25 to 30 per cent of water based on the weight of the quicklime. The actual per cent of water necessarily varies with the particular stone that has been burned. We prefer to use as low a per cent of water as possible without leaving seriously objectionable amounts of incompletely hydrated calcium oxide in the final hydrate.

The final hydrate produced by our process as thus far described is passed through a mill such as the Raymond or the Bonnett and finally bagged,—all in the ordinary way familiar to those skilled in the art of making finishing limes, the result being a dry hydrated line produced in accordance with our invention. When subsequently soaked overnight this hydrated lime has a plasticity as determined by an Emley-Berry plasticimeter of above 200, so as to be within the range designated by the Bureau of Standards in Circular No. 204, as "plastic or finishing limes". A dolomitic limestone from Pennsylvania which when analyzed showed—

|  | Per cent. |
|---|---|
| Magnesium carbonate | 44.66 |
| Calcium carbonate | 54.68 |
| Iron oxide | .47 |
| Aluminum oxide | .56 |
| Silicon dioxide | .81 | when treated in accordance with our method as above described gave a plasticity number of 367 on the Emley-Berry plasticimeter, which puts the hydrates produced from ordinary dolomitic limestone by our process in the same class as the Woodville hydrates.

Not only is the plasticity referred to a valuable characteristic but the reduction in the activity of lime is also very valuable especially in the cases of those quicklimes produced at low temperatures or by short periods of burning at higher temperatures such as in rotary kilns since these very active quicklimes cannot be handled in the ordinary manner, and what is even more serious they produce a "sandy" or coarse dry hydrated lime. Our quicklime is therefore superior under these conditions to ordinary untreated dolomitic quicklimes.

The plasticity referred to can be attained to some extent by using sodium sulphate and other similar salts in place of sodium chloride which latter is preferred on account of its effectiveness and cheapness. As much as two per cent (2%) of salt can be used without bad effect on the plasticity. Increasing the amount of salt makes the quicklime somewhat harder but does not seem to interfere with the plasticity of the subsequently moistened dry hydrate.

The salts which we add are those of the alkali metals having atomic weights between 22 and 40, inclusive, thus including sodium and its equivalents and are alkali metal salts of mineral acids.

It is not the idea of this invention to depart in any way from the methods of burning the dolomitic limestones and of hydrating or treating the quicklimes or the hydrates as commonly carried out under the best commercial practices of today but it is the idea of this invention to improve the quality of the quicklime and the products thereof by burning the ordinary dolomitic limestones in the presence of chemical salts such as are disclosed in this invention.

As will be evident to those skilled in the art, our invention permits of various modifications without departing from the spirit thereof or the scope of the appended claims.

What we claim is:—

1. The method of treating ordinary dolomitic limestone which consists in adding a mineral acid salt of an alkali metal thereto and calcining the same, producing a quicklime of retarded activity in slaking.

2. The method of treating ordinary dolomitic limestone which consists in adding a sodium salt of a mineral acid thereto and calcining the same, and subsequently converting it into a dry hydrate.

3. The method of treating ordinary dolomitic limestone which consists in adding sodium chloride thereto and calcining the same, producing a quicklime of retarded activity in slaking.

4. The method of treating ordinary dolomitic limestone which consists in adding sodium chloride thereto and calcining the same and subsequently converting it into a dry hydrate.

5. The method of treating ordinary dolomitic limestone which consists in adding a sodium salt of a mineral acid thereto in the form of an aqueous solution and calcining the same, and subsequently converting it into a dry hydrate.

6. The method of treating ordinary dolomitic limestone which consists in adding approximately sixty hundredths per cent of a mineral acid salt of an alkali metal, by weight, to the limestone and calcining the mixture and forming the resultant product into a dry hydrate.

7. The method of treating ordinary dolomitic limestone which consists in adding thereto a mineral acid salt of an alkali metal having an atomic weight between 22 and 40, inclusive, calcining the mixture and converting the resultant product into a dry hydrate.

8. The method of treating ordinary dolomitic limestone which consists in adding an alkali metal salt of a mineral acid thereto and calcining the same in a rotary kiln, producing a quicklime of retarded activity in slaking.

9. The method of treating ordinary dolomitic limestone which consists in adding an alkali metal salt of a mineral acid thereto and calcining the same in a rotary kiln, producing a quicklime of retarded activity in slaking, the salt being by weight approximately .60% of the limtstone treated.

In testimony whereof, we have signed our names to this specification this 8 day of July, 1925.

FRANK C. MATHERS.
HERMAN T. BRISCOE.